Nov. 4, 1958 N. R. BROWNYER 2,858,713
MULTI-SPEED DRIVE TRAIN FOR VEHICLE
Filed April 9, 1954 2 Sheets-Sheet 2
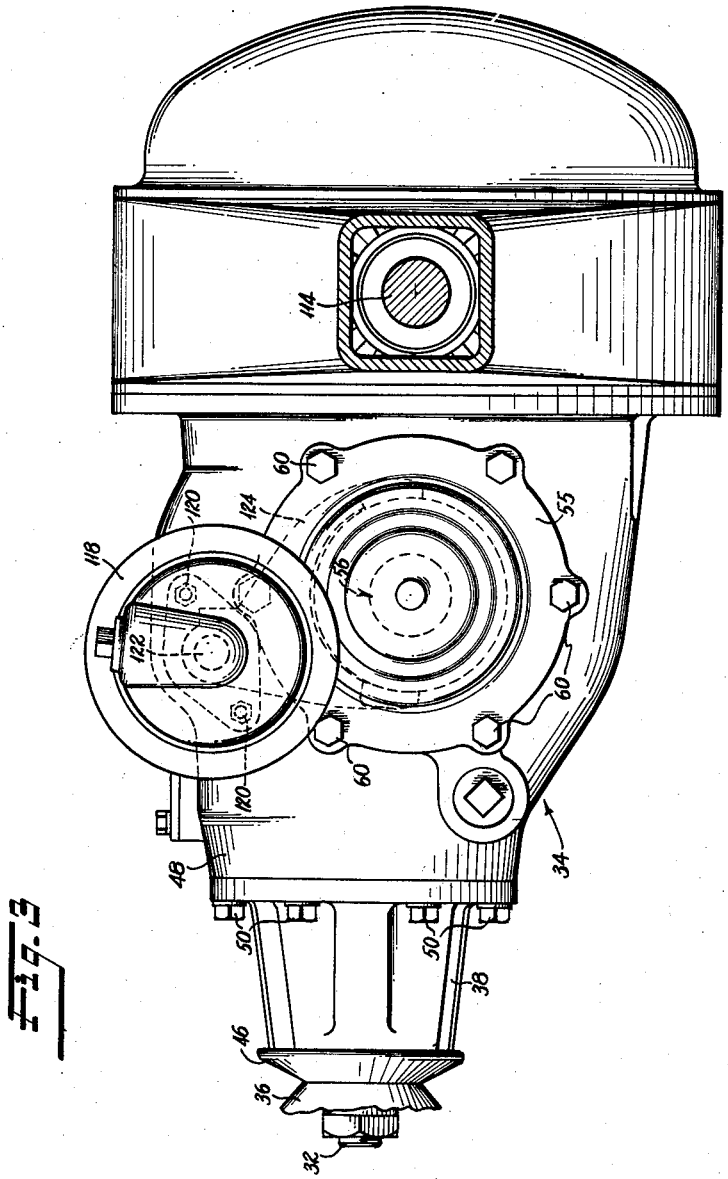
INVENTOR
NELSON R. BROWNYER
BY *Strauch, Nolan & Diggins*
ATTORNEYS United States Patent Office 2,858,713
Patented Nov. 4, 1958

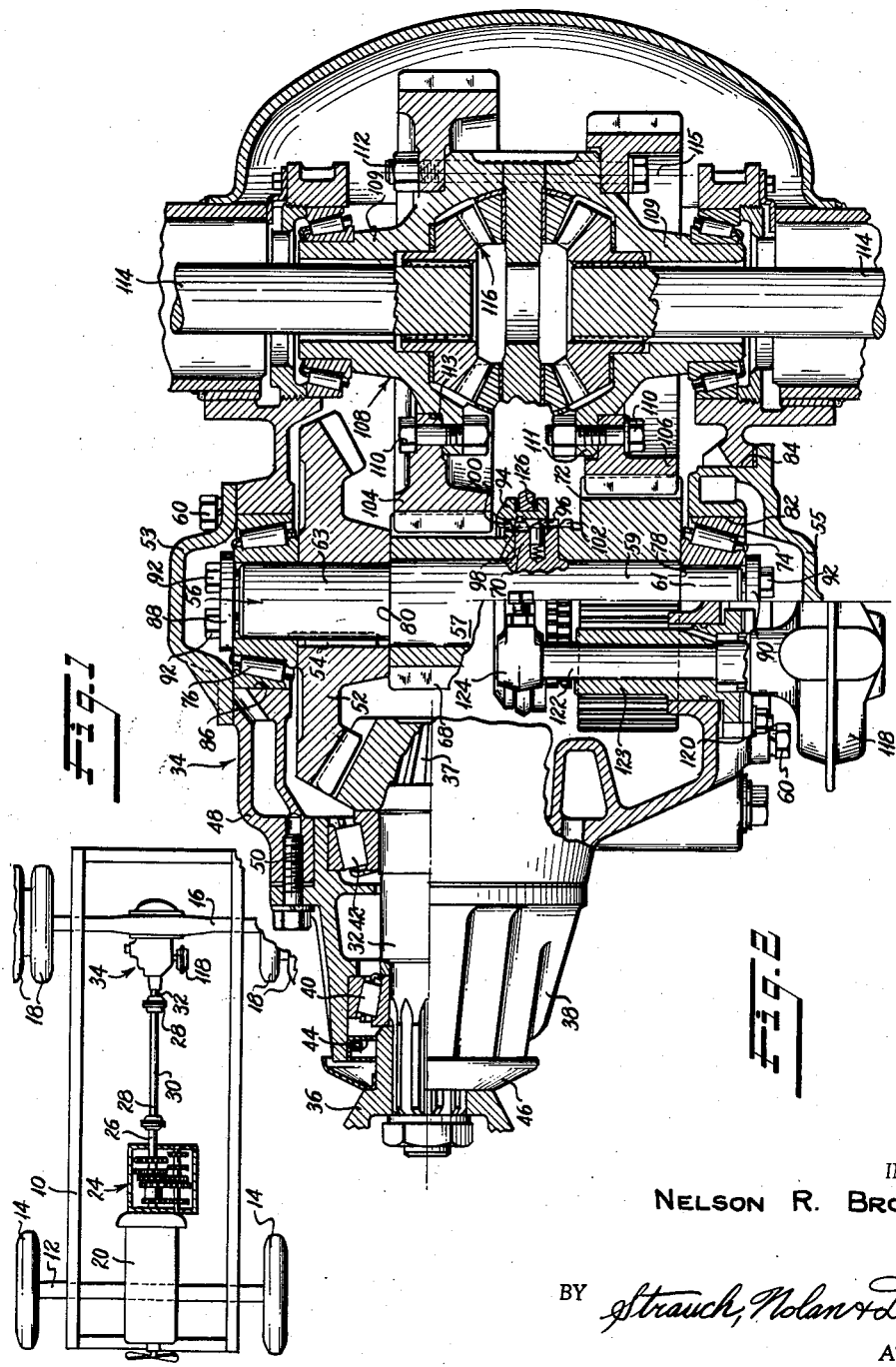

2,858,713

MULTI-SPEED DRIVE TRAIN FOR VEHICLE

Nelson R. Brownyer, Detroit, Mich., assignor to Rockwell Spring and Axle Company, Coraopolis, Pa., a corporation of Pennsylvania Application April 9, 1954, Serial No. 422,031

17 Claims. (Cl. 74—700)

This invention relates to motor vehicles and particularly to the drive train incorporating a wide-spread dual range drive axle and a special reduction gear arrangement.

Among the problems encountered in drive trains for vehicles driven under varying conditions of load and road grades is proper spacing of the engine to drive axle reduction ratios in order to make most effective and efficient use of the engine in maintaining vehicle speed over level roads, for acceleration and for gradability, in both loaded and unloaded state. In the past, one method of obtaining optimum ratio spacing has been through the use of a standard transmission with relatively widely spaced gear ratio steps available for selective shift in combination with a two-speed gear box and associated single speed axle or a two-speed axle assembly with closely spaced ratios of from 1.20 to 1.40 to 1 spread and, when necessary, split shifting the two speed gear box or axle for each transmission reduction ratio to obtain intermediate ratios. Split shifting in this manner makes operation of the vehicle difficult and complicated to the average driver and has accelerated wear of the clutching members in the two speed axle or box.

My improved vehicle drive system eliminates such split shifting and makes shifting more convenient and less complicated for the operator and eliminates excessive wear of clutching members. It utilizes a transmission with closely spaced ratios particularly in the high speeds and a new two-speed rear drive axle having widely spaced ratios.

It is therefore the major object of this invention to provide a vehicle drive train having a multiplicity of available gear ratios available in efficient succession without split shifting by means of a correlated variable speed power system and an associated improved two-speed axle.

A further object of the invention is to provide a novel vehicle drive train incorporating a transmission and two-speed axle of such related gearing reductions that the vehicle may be driven most of the time with the transmission in its higher speed ratios to reduce engine and drive train wear and simplify the driver control.

It is a further object of the invention to provide a novel vehicle drive train incorporating a transmission and a specially associated two-speed double reduction rear axle wherein driver shifting is mainly progressive and held at a minimum.

Another object of this invention is to provide a new vehicle drive train embodying a wide-spread dual range drive axle.

A further object of the invention is to provide in novel combination in a vehicle drive train a simple multi-speed transmission with two sets of reduction ratios, a low speed wide spread set and a high speed closely spaced set, and a correlated dual range axle having such wide spread reduction ratios that progressive shifting in the successive axle ranges is available.

A further object of the invention is to provide a novel dual range drive axle gear carrier assembly with a drive reduction ratio spread of from approximately 2 to 1 to 2½ to 1.

Another object of the invention is to provide in a novel vehicle drive train of the foregoing kind 2 or 3 closely spaced transmission gear ratios in the higher ranges to take the load practically all of the time during vehicle operation whether the vehicle is used with the two speed drive axle in the low speed range for city and off-the-road driving or in the high speed range for highway driving.

Further objects of the invention will become apparent as the invention proceeds in connection with the appended claims and the annexed drawings wherein:

Figure 1 is a schematic plan view of a vehicle showing the frame, engine, clutch, a diagrammatic 5 speed transmission, propeller shaft and the improved wide spread two-range axle of the invention;

Figure 2 is a top plan view partially cut-away and sectioned of the wide spread two-range carrier portion of the rear drive axle; and Figure 3 is a side view of the rear axle assembly.

With continued reference to the drawings and particularly to Figure 1, a vehicle frame 10 is supported by front axle 12 and dirigible wheels 14 and by rear drive axle 16 and wheels 18. Engine 20 is mounted on frame 10 above axle 12. Clutch 22, to which a variable speed ratio transmission 24 is operably connected, is operatively conventionally mounted to the rear of engine 20. Transmission output shaft 26, universal joints 28, propeller shaft 30 and rear axle input shaft 32 drivingly interconnect transmission 24 with two speed axle drive mechanism within axle housing 34 to be described below.

Referring to Figure 2, universal joint section 36 is splined upon shaft 32 which is integral with hypoid or bevel pinion gear 37 and is supported in the axle nose housing 38 by roller thrust bearings 40 and 42. Oil seal 44 which is protected by dust shield 46 seals the input end of housing 38.

Nose housing 38 is secured to the two speed gear box portion of a carrier housing 47 as by bolts 50. Pinion gear 37 meshes constantly with hypoid or bevel gear 52 which is keyed at 54 to cross shaft 56. Cross shaft end covers 53 and 55 are fastened to housing 48 as by bolts 60.

A low-range gear 68 is journalled on cylindrical shaft section 57. Gear 68 is restrained axially in position for free relative rotation on the cross shaft between the hub of non-rotatable gear 52 and one side of an integral clutch collar supporting shoulder 70.

A high range gear 72 is journalled on cylindrical cross shaft section 59 and restrained axially in position for free relative rotation on the cross shaft between the inner race of a cross shaft support bearing 74 and the other side of clutch collar supporting shoulder 70.

Roller thrust bearings 74 and 76 both support and axially restrain cross shaft 56 in position in housing 48. The inner race of bearing 74 is press fitted upon the reduced end section 61 of cross shaft 56 to axially restrain shaft 56 by abutment with shaft shoulder 78. The inner race of bearing 76 is press fitted upon end section 63 of shaft 56 in abutment with gear 52 which in turn abuts shaft shoulder 80.

Low range gear 68 is journalled on cross shaft 56 adjacent gear 52 because the larger diameter high range gear 72 would not have sufficient clearance with input pinion 37 if located adjacent gear 52. The size of carrier 48 is held to a minimum by so placing low range gear 68 between cross shaft drive gear 52 and cross shaft shoulder 70 and high range gear 72 on the other side of shoulder 70. Bearing 74 is supported in counter bore 82 of cross shaft end cover 55 which is a piloted fit in housing bore 84 through which cross shaft 56 and gear 72 are assembled into carrier 48. Bearing 76 is restrained axially in position in housing bore 86 by cross shaft end cover 53. The inner races of bearings 74 and 76 are fixed in assembly with cross shaft and end clamp plates 88 and 90 respectively as by bolts 92.

Clutch collar 94, which is splined at 96 to and driven by cross shaft splines 98 on shoulder 70, is axially shiftable for clutching engagement with splined clutch teeth 100 of low range gear 68 or splined clutch teeth 102 of high range gear 72. Low range gear 68 constantly meshes with a differential drive gear 104. High range gear 72 constantly meshes with another differential drive gear 106. Gears 104 and 106 are fastened to the differential case 108 by bolts 110 and through bolts 112. Differential case 108 drives the axle shafts 114 through a conventional differential spider, pinion and side gear mechanism 116 therein contained. Differential case 108 is assembled from two like case members 109 of which gear mounting flange 111, shoulder 113 and bolt circle 115 are of sufficiently small diameter to provide sufficient mounting space for the high speed gear 106, and through bolts 112 secure the case halves together.

A vacuum motor 118 is mounted on axle carrier housing 48 as by stud and nut assemblies 120. The actuating rod 122 of vacuum motor 118 which is reciprocated by a diaphragm (not shown) is connected to shift fork 124 which operatively engages groove 126 of relatively rotatable clutch collar 94.

Transmission 24 is a simple axially short multi-speed transmission with two sets of gear reduction ratios, a set of widely spaced low-speed reduction ratios and a set of closely spaced higher speed gear ratios. The higher speed transmission gear ratios take the load practically all the time during vehicle operation both when the carrier 34 is in the low speed range for city and for off-the-road driving and when in high range for high speed highway driving. Use of such short transmissions 24 permit a corresponding shortening of the vehicle wheelbase. Carrier low-range gears 68, 104 and cross shaft section 57 are narrower than in prior two speed double reduction axles because operational service demands are lessened in the invention and high range gears 72, 106 and cross shaft section 59 are wider and stronger than in prior two speed double reduction axles because operational service demands are increased for these gears in the invention. Shoulder 70 of cross shaft 56 is located to the right in Figure 2 as compared to the corresponding cross shaft shoulder of the prior two-speed axle carriers because of narrow section 57 and widened section 59. This necessitates lengthening of shift actuating rod 122 and shift rod guide 123.

In one embodiment of the invention there is approximately a 2 to 1 spread in the two speed axle carrier and a simple variable speed gearing transmission 24 of which 2 to 3 of the closely spaced higher speed gear ratios would be boosted to a higher speed range by shifting carrier 34 from the low to the high speed range.

In a vehicle which has been built and successfully operated according to the invention there is provided a two speed rear drive axle wherein the ratio between low and high speeds is 1.96 to 1, and a five speed transmission is used wherein a set of three high speed gear ratios 1.00, 1.26 and 1.58 are provided in relatively closely spaced relation and a set of two low speed ratios 2.54 and 4.62 are relatively more widely spaced.

By starting the vehicle from rest with the axle set in the low range, providing the 1.96 to 1 reduction, the operator shifts progressively through the entire transmission thereby obtaining five equivalent gear reduction ratios of 9.05, 4.98, 3.10, 2.47 and 1.96. Then he shifts the rear axle range to the high speed setting and shifts the transmission to repeat his progressive shift through the three higher speeds thereof to obtain equivalent gear reduction ratios of 1.58, 1.26 and 1.00.

The operator therefore has available eight different drive speeds which are selected with a minimum of effort and thought on his part. The six low numerical ratio higher drive speeds are uniformly spaced with about a 1.25 ratio spread, so that the shifting operations and times are evenly spaced and produce tireless smooth operation of the vehicle.

Used as such, an eight-speed drive system is especially useful if heavy loads are being handled and the prime mover is an undersized Diesel engine. The 3 high speed gear ratios, 1.00, 1.26 and 1.58, of the 5 speed transmission in the invention are substantially a geometric series and are much more closely spaced than in any prior 5 speed transmission having the highest speed gear ratio 1 to 1 and with the 3 top gear ratios arranged in a geometric series. The closest approach found in a 5 speed transmission in the prior art is a Brown-Lipe Company 5 speed transmission Model 6852 with 3 geometric series spaced top gear ratios: 1.00, 1.33 and 1.78. There the first gear ratio step to a lower speed from 1.00 to 1.33 is approximately 27% greater than the step from 1.00 to 1.26 in the transmission in the invention and the step from 1.33 to 1.78 is approximately 40% greater than the step from 1.26 to 1.58 in the transmission in the invention. The 1.96 ratio spread of the improved dual range axle of the invention, by a shift to low, shifts the transmission gear ratios 1.00 1.26 and 1.58, respectivley, to 1.96, 2.47 and 3.10 drive train ratios to provide 3 additional substantially uniform gear ratio steps if needed.

When moderately heavy loads are handled, the prime mover 20 is usually a gasoline engine, and the foregoing 5 speed transmission and two range drive axle may be used as a 6 speed drive train starting with the axle in the low speed range and the transmission in first speed and then shifting the axle to high range as soon as the vehicle starts to roll. This would give drive train gear ratios of 1.00, 1.26, 1.58, 2.54, 4.62 and 9.05. When the truck is empty or lightly loaded the two range rear axle may be left in high range continually to obtain the five effective gear reduction ratios of the transmission which will be adequate.

In normal operation of the vehicle with the axle set in the low range the variable speed transmission 24 is shifted through its range of gear ratios before the dual range carrier 34 is shifted. In order to shift to progressively higher speed gear ratios after having run through the transmission ratios with the dual range axle 16 engaged and driving in the low speed range, vacuum chamber 118 is first actuated to shift the axle to the high speed range. The operator then completes the shift to select the particular transmission speed desired in the usual manner, and in that time the axle shift from low to high range is completed. When shifting the axle 16 from high to low range during progressive shifting to slower speed gear ratios, the transmission 24 is shifted to a higher speed gear ratio and then, just before engaging the clutch, vacuum chamber 118 is actuated for the shift from high to low range. The shift to low speed range is completed when the clutch is engaged and engine driven cross shaft 56 is brought up to the speed of low range gear 68 by increasing the engine speed. This eliminates split shifting as used with conventional prior two-speed gear boxes and axles thereby reducing carrier clutching tooth wear and greatly simplifying the operator's shifting job.

There is hereby provided a new improved drive train for vehicles including a simple multi-speed transmission with two sets of gear reduction ratios, a set of widely spaced low speed reduction ratios and a set of closely spaced high speed gear reduction ratios and a correlated two-range rear axle drive. It provides a drive train in which the two or three highest speed reduction ratios in the transmission are used during most driving whichever range is selected in the axle.

Vehicles equipped according to the invention are peculiarly adapted for both on and off the road operation with significant advantages over the conventional transmission, two speed gear box and single speed drive axle combinations used in most drive trains today where reductions auxiliary to the transmission are required.

The drive train of the present invention is less costly than in such prior vehicles, lighter in weight and there is only one major unit to install and service. The use of a simple axially short transmission reduces universal joint problems in short wheel base vehicles. The shifting sequences available in the invention reduce driver fatigue and eliminate wear due to excessive shifting and ratio splitting encountered in the prior vehicles. In some industries where the trucks make all trips in one direction loaded and in the other direction unloaded, the invention greatly simplifies the shifting procedure of the driver, as for example he can stay in the high speed axle condition all of the time when unloaded.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is to be claimed and desired to be secured by United States Letters Patent is:

1. A roadway vehicle drive train effective to provide a progressive series of selectable over-all drive train reduction ratios without the necessity of split shifting while minimizing the drive train axle torque input requirements, a variable speed transmission comprising shiftable gearing providing a plurality of speed reduction ratios of predetermined spacing, and a variable speed drive axle operatively connected to said transmission, said drive axle comprising selective gearing providing at least two speed ratio drives of predetermined spacing; the spacing of said axle ratios being such in relation to the spacing of said transmission ratios that by starting with the axle drive selected for its lower speed ratio and shifting through the entire transmission range, then shifting the drive axle to its higher speed ratio and the transmission back to a predetermined speed setting in its range which is at least a plurality of speeds below its highest speed, and then normally shifting only the transmission toward said highest speed, a series of successively increasing short step vehicle drive speed ratios whereby the high (numeric) over-all drive train ratio reductions are all provided by the coaction of said axle lower speed ratio with the ratio reductions of said transmission and the low (numeric) over-all drive train ratio reductions are provided by the coaction of the axle higher speed ratio with the transmission ratio reductions providing said predetermined and higher speeds thereby minimizing the maximum torque input requirements of said axle for the given over-all drive train ratio reduction progressive series is obtained.

2. The drive train defined in claim 1 wherein the ratio reduction of said transmission corresponding to said predetermined and higher speed settings are spread in increments from approximately 20% to 30%.

3. The drive train defined in claim 1 wherein the ratio reductions of said transmission corresponding to said predetermined and lower speed settings are spread in increments from approximately 50% to 100%.

4. The drive train defined in claim 1 wherein the ratio reductions of said transmission corresponding to said predetermined and higher speed settings are spread in increments from approximately 20% to 30% and the ratio reductions of said transmission corresponding to said predetermined and lower speed settings are spread in increments from approximately 50% to 100%.

5. The drive train defined in claim 1 wherein the high speed ratio of said axle is related to the low speed ratio of said axle in a ratio of at least 1.58 to 1.

6. A roadway vehicle drive train effective to provide a progressive series of selectable over-all drive train reduction ratios without the necessity of split shifting while minimizing the drive train axle torque input requirements, a variable speed transmission comprising shiftable gearing providing a plurality of speed reduction ratios of predetermined spacing consisting of a group of widely spaced high (numerically) speed ratio reductions and a group of closely spaced low (numerically) speed ratio reductions, and a variable speed drive axle operatively connected to said transmission, said drive axle comprising selective gearing providing at least two speed ratio drives of predetermined spacing; the spacing of the axle ratios being such in relation to the spacing of the transmission ratios that by starting with the axle drive selected for its lower speed ratio, then shifting through the entire transmission range, then shifting the drive axle to its higher speed ratio and the transmission back to the beginning of its higher speed group, and then shifting the transmission through its higher speed range, there is obtained a series of successively increasing short step vehicle drive speed ratios whereby all the high (numeric) over-all drive train ratio reductions are provided by the coaction of said axle lower speed ratio with the ratio reductions of said transmission and the low (numeric) over-all drive train ratio reductions are provided by the coaction of the axle higher speed ratio with the transmission closely spaced ratio reduction group thereby minimizing the maximum torque input requirements of said axle for the given over-all drive train ratio reduction progressive series.

7. The combination defined in claim 6, in which the speed reductions of the higher speed group vary in a first uniform progression, and the speed reductions of the lower speed group vary in a second uniform progression.

8. In the combination defined in claim 7, the speed reductions of said first progression having a certain percentage of downward variation, the speed reductions of the second progression having another but higher percentage of downward variation, and the drive axle ratio spread being about two to two and one-half to one.

9. The combination defined in claim 6 wherein the speed reductions of the higher speed group are spread in increments of approximately 20% to 30%.

10. The combination defined in claim 6 wherein the speed reductions of the lower speed group are spread in increments from approximately 50% to 100% and the highest speed of the lower speed group and the lowest speed of the higher speed group are spread in an increment from approximately 50% to 100%.

11. The combination defined in claim 6 wherein the speed reductions of the higher speed group are spread in increments from approximately 20% to 30% and wherein the speed reductions of the lower speed group are spread in increments from approximately 50% to 100% and the highest speed of the lower speed group and the lowest speed of the higher speed group are spread in an increment from approximately 50% to 100%.

12. The drive train defined in claim 6 wherein the transmission provides selectively available ratios of approximately 1.00, 1.26, 1.58, 2.54 and 4.62 and wherein the higher axle speed ratio is related to the lower axle speed ratio in a ratio of between approximately 1.58 to 1 and approximately 2.54 to 1.

13. The drive train defined in claim 12 wherein the higher axle speed ratio is related to the lower axle speed ratio in a ratio of about 2 to 1.

14. For use in a vehicle drive train embodying a multiple speed transmission comprising shiftable gearing providing a plurality of ratio reductions of predetermined spacing; a relatively lightweight variable speed drive axle effective in cooperation with such a transmission when drive-connected thereto to provide a progressive series of selectable over-all drive train ratio reductions of greater number than said plurality of transmission ratio reductions without the necessity of split shifting and with relatively low axle torque input requirements; said axle comprising selective gearing providing at least two speed ratio drives of predetermined wide spacing; the spacing of said axle ratios being sufficiently great to span a plurality of at least the lowermost (numeric) ratio reductions of such a transmission whereby, in a transmission equipped drive train embodying such an axle, by starting with the axle drive selected for its lower speed ratio and shifting through the entire transmission range, then shifting the drive axle to its higher speed ratio and the transmission back to the highest of said plurality of at least the lowermost ratio reductions and then normally shifting only the transmission toward its lowest (numeric) ratio reduction, a series of successively decreasing vehicle drive train over-all ratio reductions is obtained and whereby the high (numeric) over-all drive train ratio reductions may be provided by the coaction of the axle lower speed ratio with the transmission ratio reductions and the low (numeric) over-all drive train ratio reductions may be provided by the coaction of the axle higher speed ratio with the plurality of transmission lowermost ratio reductions thereby maintaining the torque input requirements of said axle relatively low.

15. The axle defined in claim 13 wherein said axle high speed ratio is related to said axle low speed ratio in a ratio of at least 1.58 to 1.

16. The axle defined in claim 13 wherein said axle high speed ratio is related to said axle low speed ratio in a ratio of between approximately 1.58 to 1 and approximately 2.54 to 1.

17. The axle defined in claim 13 wherein said axle high speed ratio is related to said axle low speed ratio in a ratio of approximately 2 to 1.

References Cited in the file of this patent
UNITED STATES PATENTS

| | | |
|---|---|---|
| 2,183,667 | Buckendale | Dec. 19, 1939 |
| 2,351,590 | Alden et al. | June 20, 1944 |
| 2,384,781 | Rockwell et al. | Sept. 11, 1945 |
| 2,398,407 | Brownyer | Apr. 16, 1946 |
| 2,460,295 | Keese | Feb. 1, 1949 |
| 2,617,310 | Randol | Nov. 11, 1952 |
| 2,637,221 | Backus et al. | May 5, 1953 |